Figure 4:
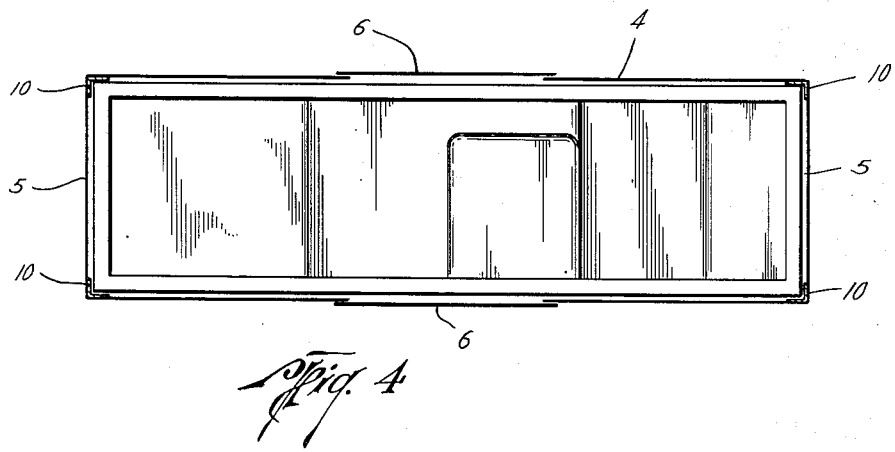

Oct. 2, 1956  C. K. FINNELL  2,764,950
FREIGHT CAR BALLAST
Filed May 10, 1954  2 Sheets-Sheet 1
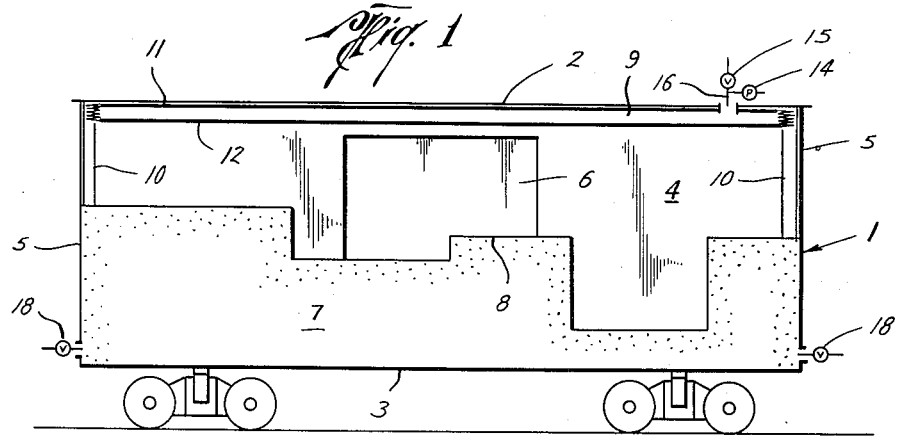
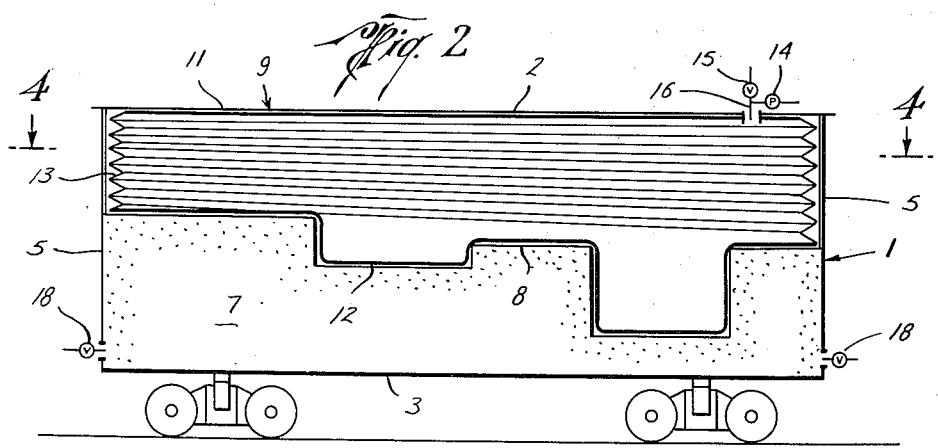
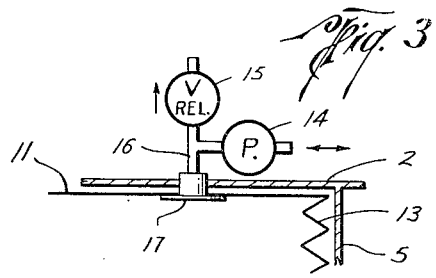
Calvin K. Finnell
INVENTOR.
BY Frank B. Pugsley
ATTORNEYS Oct. 2, 1956      C. K. FINNELL      2,764,950
FREIGHT CAR BALLAST Filed May 10, 1954      2 Sheets-Sheet 2

Calvin K. Finnell
INVENTOR.

BY Frank B. Pugsley

ATTORNEYS

United States Patent Office 2,764,950
Patented Oct. 2, 1956

2,764,950
FREIGHT CAR BALLAST

Calvin K. Finnell, Houston, Tex.

Application May 10, 1954, Serial No. 428,754

3 Claims. (Cl. 105—369)

This invention relates to improvements in cargo-carrying vehicles such as transport trucks, air cargo planes and railway tank and freight cars, and more specifically to a means for protecting the contents or cargo of said conveyances during shipment.

It has heretofore been customary, in packing cargo in conveyances of the type mentioned, to lash or anchor many of the packages or articles to be shipped and to carefully arrange or stack the articles in order to prevent load shifting and other damages that may occur in the transportation of merchandise. Such methods, however, are time consuming and are not entirely satisfactory, particularly in the case of cargo consisting of small packages of varying sizes. Moreover, in the case of liquid shipments insufficient to fill the tank car, there is no satisfactory ballast arrangement in use.

It is therefore the principal object of my invention to provide a new and improved means of protection for all types of articles in shipment. It is a further object of this invention to secure boxes, cartons and other articles under pressure to prevent load shifting and other damage that might occur in the transportation of merchandise. It is a further object of my invention to provide a means of securing cargo that may be easily and quickly effected to afford a substantial saving in time and labor.

It is a further object to maintain proper load balance and to prevent deteriorating damages in the transportation of liquids in partially-filled tank cars.

With these objects in mind I have shown and described, for purposes of illustration, two embodiments of my invention, both of which are part of my generic inventive concept.

In carrying out my invention, I provide a relatively large inflatable air-tight bag arranged to cover the complete storage area of a cargo carrier. Preferably the top of the bag is attached to the ceiling of the carrier's enclosure, the ends and sides of the bag are of an expandable construction, and the bottom is of a very flexible and resilient puncture-proof material. An air pump is mounted on the outside of the car in communication with the bag, and is adapted to deflate as well as inflate the bag. After the car is loaded, the bag is inflated, causing it to expand downwardly against the top of the cargo to hold it securely under pressure during shipment. When the cargo reaches its destination, the bag is deflated, causing it to collapse at the top of the car so that the door may be opened and the car unloaded.

Figure 5:
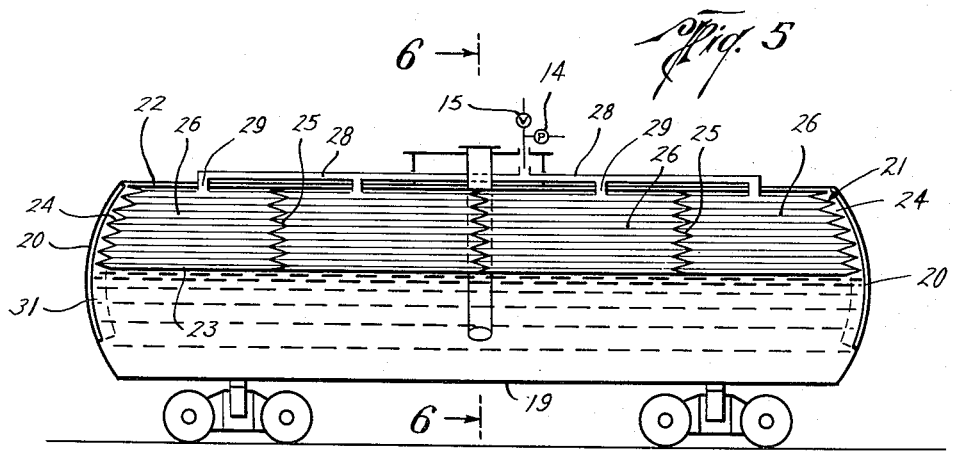
Figure 6:
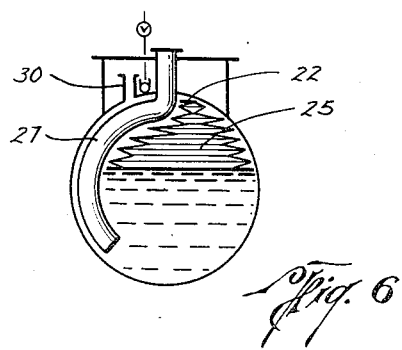

The features of my invention which I believe to be novel are set forth with particularity in the appended claims. My invention itself, however, together with further objects and advantages thereof, may best be understood by reference to the following description taken in connection with the accompanying drawing, in which Fig. 1 is a vertical section view of a railway freight car showing my air ballast bag in collapsed condition; Fig. 2 is a vertical section view of a railway freight car showing my air ballast bag in expanded condition; Fig. 3 is a fragmentary section view of a railway freight car showing the valve and pump arrangement for the admission and exhaustion of air to and from the ballast bag; Fig. 4 is a section view of the freight car and air ballast bag taken along line 4—4 of Fig. 2; Fig. 5 is a section view of the railway tank car showing a modified form of my invention; and Fig. 6 is a section view of railway tank car and ballast bag taken along line 6—6 of Fig. 5.

Referring now to Figs. 1 to 4, there is shown a railway freight car 1 including a ceiling 2, a floor 3, side walls 4 and end walls 5. Slidably mounted on the sidewalls 4 in the conventional manner are doors 6. Arranged or stacked above the floor 3 is the cargo 7, comprising a heterogeneous assortment of packages, boxes, cartons, etc., presenting an irregular, exposed upper surface 8. Arranged within the freight car enclosure 1 and secured to the ceiling 2 thereof is my expandable air tight ballast bag 9 the corners of which are guided, as more fully described hereinafter, by angle members 10 (Fig. 4) secured in the corners of the car 1. The ballast bag includes the top wall 11 which may, if desired, be of a fairly rigid construction, fixedly secured over its area to the ceiling 2 so as to form a cover or liner for substantially the entire area of the ceiling. Depending downwardly from all sides of the top wall 11 are bellows-type expandable, vertical side and end walls 13 sealed around the periphery of the top wall 11 and, similarly, at their lower ends, around a horizontal bottom wall 12 to form a unitary, air-tight structure. While the top wall 11, if desired, may be of a fairly inflexible material, the bottom wall 12 should be of a very flexible, resilient and puncture resistant material; this material may be, for example, one of the common synthetic rubbers.

Compressed air or the like is pumped into the bag or exhausted therefrom by means of a reversible air pump 14 through a conduit system including a pump by-pass relief valve 15 and combination fill and exhaust pipe or hose 16. A flange 17, carried on the lower end of pipe 16, is sealed around an accommodating opening in the bag 11 and secured to the ceiling 2.

When the freight car is loaded and the cargo 7 is stacked above the floor 3 of the freight car, the doors 6 are closed and air pump 14 is operated to inflate the bag 9. As the bag expands it slides down the guide angles 10 in each corner of the car, whereupon the bottom wall 12 of the bag, being extremely flexible, nestles snugly around each top case in the load, restraining it against shifting its position. If the freight car is air-tight when the doors 6 are closed, provision must be made for exhausting the air in the car as the bag 9 is inflated. For this purpose I provide air pressure relief valves 18 at each end of the enclosure 1 near the bottom thereof.

The air pump 14 may be provided with an automatic cutoff valve (not shown), of conventional design so that inflation of the bag may be stopped at any predetermined pressure. This selectivity is desirable since the pressure required would vary for different types of merchandise being shipped. Since the bag 9 is air-tight, this pressure would be maintained until the bag is again deflated.

Before unloading the car, the air pump 14 would be operated to pump the air out of the bag 9 so that the bag would slide back up the four angles 10 in the corners of the car until it is collapsed by atmospheric pressure at the top of the car.

In the modification shown in Figs. 5 and 6, the air ballast bag is adapted for use in a substantially cylindrical tank car or truck 19, the tank having substantially circular end walls 20. In this instance the top wall 22 of the bag is relatively small in size and is securely and rigidly fastened to the top portion of the cylindrical tank sides 19. The bottom wall 23 is extremely flexible, and is normally of a size substantially equal to the largest horizontal cross-sectional area of the tank 19. Bellows-type expandable side and end walls 24 are sealed at their upper edges around the periphery of the top wall 22 and at their lower edges around the periphery of the bottom wall 23 to form a unitary, air-tight bag structure 21. The bag 21 is of gradually increasing cross-section from top to bottom to permit a snug fit of the bag against the curving side walls of the cylindrical tank 19, when the bag is expanded with the four corner edges of the bag engaging the curvilinear guide angles 31. Transversely arranged across the bag and sealed therein to form a series of air-tight compartments 26 within the bag are bellows-type expandable dividing walls 25.

The air pump 14, again provided with the pressure relief valve 15, communicates through a pipe or hose 28, running longitudinally of the tank car, and inlet ports 29, with each compartment 26, thus providing for simultaneous inflation or deflation. The pressure relief valve 15 provided on the compressed air line of the pump 14, serves to prevent over-inflation of the bag 21 and, hence, to prevent the liquid in the tank 19 from being forced out through the air vent 30 forward to the liquid filter pipe 27. Due to the presence of the dividing walls 25, air will not be permitted to rush from one end of the bag to the other except through the ports 29 and pipe 28. Consequently, a sudden flow of the liquid to one end of the tank car 17 during the acceleration or deceleration thereof will be resisted since the resultant displacement of air from the high pressure area to the low pressure area will similarly be resisted by the dividing walls 25. In absence of these dividing walls 25 sloshing could not be prevented regardless of the pressure in the bag 21. The ports 29 preferably have adjustable openings so that the flow restriction may be regulated for optimum performance.

The cylindrical tank 19 is also provided with an air vent 30 to exhaust the air from within the tank as the bag is expanded.

Mounted on the tank car so as to extend downwardly into the cylindrical tank 19 is a filler pipe 27 through which the car is loaded. Obviously, the filler pipe 27 must be extended below the bottom of the bag and into the lower portion of the cylindrical tank 19. As shown in Figs. 5 and 6, the air-tight expandable bag 21 is adapted to closely surround the filler pipe 27. It is to be understood that the filler pipe 27 may be extended downwardly either at the center of the tank, in which case the bag 21 would completely surround it, or closely adjacent the side of the tank as shown, in which case the bag 21 need only partially surround it.

While I have described my invention with particular application to railway cars and with reference to the illustrated construction of the air ballast bag, it will be understood that those skilled in the art may make many modifications, variations and changes. I contemplate, therefore, by the appended claims to cover all such modifications as come within the true spirit and scope of my invention.

Having described my invention I claim:

1. In a cargo carrier comprising a rigid enclosure adapted to carry cargo in the lower portions thereof, an inflatable air-tight ballast bag having a top wall attached to the upper portions of said enclosure, a flexible bottom wall equal in size to the largest horizontal cross-section of said enclosure, and expandable side and end walls engaging the lateral portions of said enclosure, means selectively operable in one state to inflate said bag and force said bottom wall downwardly to exert pressure against the cargo disposed within said enclosure and in another state to deflate said bag and contract said side and end walls to cause said bottom wall to be elevated to the upper portions of said enclosure, and substantially vertical angle guideways mounted within said enclosure to slidably engage the corner edges of said bag to guide said edges during expansion or contraction thereof.

2. In a railway tank car or the like adapted for the transportation of liquids and comprising a substantially cylindrical enclosure and a filler pipe extending from above said enclosure downwardly into said enclosure, the combination with said tank car of an inflatable air-tight ballast bag arranged within said enclosure, said bag including a top panel which is secured to the upper part of said enclosure, a horizontally disposed flexible bottom wall of such size and shape as to snugly engage said filler pipe and to cover the largest horizontal cross-section of said enclosure, and expandable surrounding walls, selectively operated means to inflate said bag to force said bottom wall downwardly into pressure exerting engagement with the upper surface of the liquid in said enclosure, and to deflate said bag and to cause said surrounding walls to contract and said bottom wall to recede toward the upper portion of said enclosure, and means to limit the fluctuation of air pressure from one end of said bag to the other in response to sudden flow of liquid to one end of said enclosure.

3. The combination defined in claim 2 wherein the means to limit the fluctuation of air pressure comprises a series of dividing walls adapted to expand with said surrounding walls arranged transversely within said air-tight bag to form a series of compartments, and flow-limiting ports interconnecting said compartments.

References Cited in the file of this patent

UNITED STATES PATENTS

| | | |
|---|---|---|
| 1,320,012 | Lee et al. | Oct. 28, 1919 |
| 1,457,496 | Butler | June 5, 1923 |
| 1,675,957 | Reeves | July 3, 1928 |
| 2,674,206 | Scott | Apr. 6, 1954 |